US012270322B1

(12) United States Patent
Roberts et al.

(10) Patent No.: US 12,270,322 B1
(45) Date of Patent: Apr. 8, 2025

(54) SYSTEM AND METHOD FOR ACTUATING ENGINE VALVES INCLUDING A RECOMPRESSION RELIEF VALVE EVENT

(71) Applicant: Jacobs Vehicle Systems, Inc., Bloomfield, CT (US)

(72) Inventors: Gabriel S. Roberts, Wallingford, CT (US); John Mandell, Vernon, CT (US); Thomas Benner, Longmeadow, MA (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 18/906,834

(22) Filed: Oct. 4, 2024

Related U.S. Application Data

(60) Provisional application No. 63/587,789, filed on Oct. 4, 2023.

(51) Int. Cl.
*F01L 1/26* (2006.01)
*F01L 1/08* (2006.01)
(Continued)

(52) U.S. Cl.
CPC ................. *F01L 1/267* (2013.01); *F01L 1/08* (2013.01); *F01L 13/0015* (2013.01);
(Continued)

(58) Field of Classification Search
CPC ... F01L 1/08; F01L 1/267; F01L 1/344; F01L 13/0015; F01L 2013/0089; F01L 13/08;
(Continued)

(56) References Cited

U.S. PATENT DOCUMENTS 7,712,449 B1 5/2010 Schwoerer
8,978,601 B2 3/2015 Williams et al.
(Continued)

FOREIGN PATENT DOCUMENTS

JP 61-151047 9/1986
JP 2005-299473 A 10/2005
(Continued)

OTHER PUBLICATIONS

International Search Report for Application No. PCT/IB2024/059751; mailed on Jan. 7, 2025; 3 pages.
(Continued)

*Primary Examiner* — Jorge L Leon, Jr.
(74) *Attorney, Agent, or Firm* — Jordan IP Law LLC

(57) ABSTRACT

A valve actuation system for actuating at least one of two or more engine valves in an internal combustion engine comprises at least one motion source including a first motion source configured to provide an exhaust main valve event. A valve train for conveying valve events from the at least one motion source to the two or more engine valves comprises a lost motion component for selectively conveying valve events to the at least one of the two or more engine valves. A phasing assembly is configured to advance a phase of at least the first motion source and the exhaust main valve event. The at least one motion source is configured to provide a recompression relief valve event to the at least one of the two or more engine valves when the phase of the exhaust main valve event is advanced.

11 Claims, 14 Drawing Sheets

(51) Int. Cl.

| | |
|---|---|
| ***F01L 13/00*** | (2006.01) |
| ***F01L 13/08*** | (2006.01) |
| ***F02D 13/02*** | (2006.01) |
| *F01L 1/344* | (2006.01) |

(52) U.S. Cl.
CPC .......... *F01L 13/08* (2013.01); *F02D 13/0246* (2013.01); *F01L 1/344* (2013.01); *F01L 2013/0089* (2013.01); *F01L 13/085* (2013.01); *F01L 2800/06* (2013.01); *F02D 13/0261* (2013.01); *F02D 13/0276* (2013.01)

(58) Field of Classification Search
CPC . F01L 13/085; F01L 2800/06; F02D 13/0246; F02D 13/0261; F02D 13/0276
USPC ......................... 123/90.16, 90.17, 90.4, 90.6
See application file for complete search history.

(56) References Cited

U.S. PATENT DOCUMENTS

| | | | | |
|---|---|---|---|---|
| 9,512,746 | B2 | 12/2016 | Baltrucki et al. | |
| 9,790,824 | B2 | 10/2017 | Baltrucki et al. | |
| 11,060,426 | B2 | 7/2021 | Mandell et al. | |
| 2019/0301383 | A1* | 10/2019 | Ulrey | F02D 13/0257 |
| 2020/0122709 | A1* | 4/2020 | Cunningham | F02D 13/0207 |
| 2021/0156323 | A1 | 5/2021 | Vassallo et al. | |
| 2021/0340891 | A1 | 11/2021 | Roberts et al. | |
| 2022/0389878 | A1* | 12/2022 | Persson | F02D 13/0219 |

FOREIGN PATENT DOCUMENTS

| | | | |
|---|---|---|---|
| JP | 2009-102991 | A | 5/2009 |
| JP | 2013-160172 | A | 8/2013 |

OTHER PUBLICATIONS

Written Opinion for Application No. PCT/IB2024/059751; mailed on Jan. 7, 2025; 4 pages.

* cited by examiner

- PRIOR ART -

- PRIOR ART -

- PRIOR ART -

SYSTEM AND METHOD FOR ACTUATING ENGINE VALVES INCLUDING A RECOMPRESSION RELIEF VALVE EVENT

FIELD

The present disclosure relates generally to systems and methods for actuating an engine valve and, in particular, to such systems and methods that include a recompression relief valve event.

BACKGROUND

Systems for actuating one or more engine valves in internal combustion engines are well known in the art. FIG. 1 is a partial schematic illustration of an internal combustion engine 100 including a cross-sectional view of an engine cylinder 102 and related valve actuation systems in accordance with prior art techniques. Although a single cylinder 102 is illustrated in FIG. 1 for ease of illustration, it is appreciated that internal combustion engines often include multiple such cylinders driving a crankshaft (not shown). The engine cylinder 102 has disposed therein a piston 104 that reciprocates upward and downward repeatedly during both positive power operation (i.e., during combustion of fuel to drive the piston 104 and the drivetrain) and auxiliary operation of the cylinder 102. At the top of each cylinder 102, there may be at least one intake valve 106 and at least one exhaust valve 108. The intake valve(s) 106 and the exhaust valve(s) 108 are opened and closed to provide communication with an intake gas passage 110 and an exhaust gas passage 112, respectively. Valve actuation forces to open the intake valve 106 and exhaust valve 108 are conveyed by respective valve trains 114, 116. In turn, such valve actuation forces (illustrated by the dashed arrows) may be provided by respective main and/or auxiliary motion sources 118, 120, 122, 124 such as rotating cams. As used herein, the descriptor "main" refers to so-called main event engine valve motions, i.e., valve motions used during positive power generation, whereas the descriptor "auxiliary" refers to other engine valve motions for purposes other than positive power generation (e.g., compression release braking, bleeder braking, cylinder decompression, brake gas recirculation (BGR), etc.) or in addition to positive power generation (e.g., early exhaust valve opening (EEVO), internal exhaust gas recirculation (IEGR), variable valve actuations (VVA), Miller/Atkinson cycle, swirl control, etc.).

The valve trains 114, 116 may include any number of mechanical, hydraulic, hydro-mechanical, electromagnetic, or other type of valve train elements known in the art. For example, each of the valve trains 114, 116 may include one or more cam followers, push tubes, rocker arms, valve bridges, etc. used to transfer valve actuation motion to the valves 106, 108. Additionally, one or more lost motion components 126, 128 may be included in either or both valve trains 114, 116 whereby some or all of the valve actuation motions typically conveyed from the auxiliary motion sources 120, 124 by the valve trains 114, 116 are prevented from reaching the valves 106, 108, i.e., they are "lost." Though not depicted in FIG. 1, it is known to also incorporate lost motion components in the path between one or more of main motion sources 118, 122 and the corresponding engine valves 106, 108.

Such lost motion components 126, 128 typically comprise an element that may be selectively controlled (typically via the application or removal of hydraulic fluid) to assume either a retracted/compliant state in which valve actuation motions that might otherwise be conveyed by the element are either avoided or absorbed, thereby losing such motions, or in an extended/rigid state in which such valve actuation motions are conveyed through the element. For example, U.S. Pat. No. 9,512,746 illustrates an example of an actuator piston 762 (FIG. 7) that may be hydraulically locked in an extended position or permitted to retract into a corresponding bore. As a further example, U.S. Pat. No. 9,790,824 describes a hydraulically-controlled, mechanical locking mechanism that is normally in a locked/un-collapsed or motion-conveying state, and that may be switched to an unlocked/collapsed or motion-absorbing state when hydraulic fluid is applied.

Internal combustion engines may utilize cam phasers (not shown in FIG. 1), which are variable cam timing (VCT) devices that adjust the timing (phase) of an engine camshaft in relation to the engine crankshaft. Adjusting cam phase, in turn, results in modification of the intake and/or exhaust valve motion during engine operation, which can provide performance and efficiency benefits. Examples of such cam phasing are illustrated in FIGS. 2 and 3, where FIG. 2 illustrates typical main exhaust 202 and main intake 204 valve events (also referred to in the art as valve actuation motions). As shown, the main exhaust valve event 202 typically occurs between bottom-dead center (BDC) and top-dead center (TDC) travel of the piston 104 during an exhaust stroke, whereas the main intake valve event 204 typically occurs between TDC and BDC during an intake stroke. Of note is the overlap region 206, arising both before and after TDC between the exhaust and intake strokes, in which both the exhaust and intake valves are open for a short period of time. In this manner, the cylinder is not sealed shut when the main intake valve event 204 begins its opening phase (just prior to TDC), thereby avoiding opening of the intake valve against any substantial pressure, thereby avoiding potentially excessive loads on the intake valve train. This also avoids an occurrence of a potentially significant pressure differential between the intake gas passage 110 and the cylinder 102, which could lead to so-called engine recompression noise as fluid rushes between the two.

FIG. 3 illustrates use of a cam phaser that causes advancement of the exhaust main valve event 202 (i.e., causes the event to occur earlier than normal), which may occur, for example, where EEVO operation is desired. Such use of cam phasers may present challenges, however. Typically, when the exhaust main event valve motion is advanced away from overlap with the intake main event at TDC using a cam phaser, as shown in FIG. 3, high cylinder pressure can build up between the exhaust valve closing (conclusion of the advanced main intake valve event 202') and intake valve opening since overlap 206 of the main exhaust and intake valve events is no longer provided. The resulting recompression within the engine cylinder and the intake valve opening against such high cylinder pressure can cause high load on the intake valvetrain and/or objectionable noise.

Thus, techniques that eliminate, or at least mitigate, such challenges resulting from the use of cam phasers would represent a welcome advancement of the art.

SUMMARY

The above-noted shortcomings of prior art solutions are addressed through the provision of a recompression relief valve event. Thus, in an embodiment, a system is provided for actuating at least one of two or more engine valves in an internal combustion engine comprising at least one motion source. The at least one motion source includes a first motion source configured to provide an exhaust main valve event. The internal combustion engine comprises a valve train for conveying valve events from the at least one motion source to the two or more engine valves, where the valve train also comprises a lost motion component for selectively conveying valve events from the at least one motion source through the valve train to the at least one of the two or more engine valves. The system further includes a phasing assembly configured to advance a phase of at least the first motion source and the exhaust main valve event. The at least one motion source is configured to provide a recompression relief valve event to the at least one of the two or more engine valves via the valve train and the at least one lost motion component when the phase of the exhaust main valve event is advanced.

In an embodiment, the recompression relief valve event is configured to overlap with an intake main valve event.

In an embodiment, the at least one motion source includes a second motion source configured to provide the recompression relief valve event. In this embodiment, the phasing assembly may be configured to advance a phase of the second motion source and the recompression relief valve event. Furthermore, the second motion source can be configured to also provide an auxiliary valve event. Further still, the at least one motion source in this embodiment may include a third motion source configured to provide an auxiliary valve event.

In an embodiment, the first motion source is configured to provide the recompression relief valve event. In this case, the at least one motion source may include a second motion source configured to provide an auxiliary valve event. In this embodiment, the phasing assembly can be configured to advance a phase of the second motion source and the auxiliary valve event. In further refinements of this embodiment, the at least one motion source may include a second motion source configured to provide a replicated exhaust main valve event, or the first motion source is configured to also provide an auxiliary valve event.

A corresponding method is also disclosed.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION OF THE PRESENT EMBODIMENTS

As used herein, phrases substantially similar to "at least one of A, B or C" are intended to be interpreted in the disjunctive, i.e., to require A or B or C or any combination thereof unless stated or implied by context otherwise. Further, phrases substantially similar to "at least one of A, B and C" are intended to be interpreted in the conjunctive, i.e., to require at least one of A, at least one of B and at least one of C unless stated or implied by context otherwise. Further still, the term "substantially" or similar words requiring subjective comparison are intended to mean "within manufacturing tolerances" unless stated or implied by context otherwise.

As used herein, the phrase "operatively connected" refers to at least a functional relationship between two elements and may encompass configurations in which the two elements are directed connected to each other, i.e., without any intervening elements, or indirectly connected to each other, i.e., with intervening elements.

Figure 1:
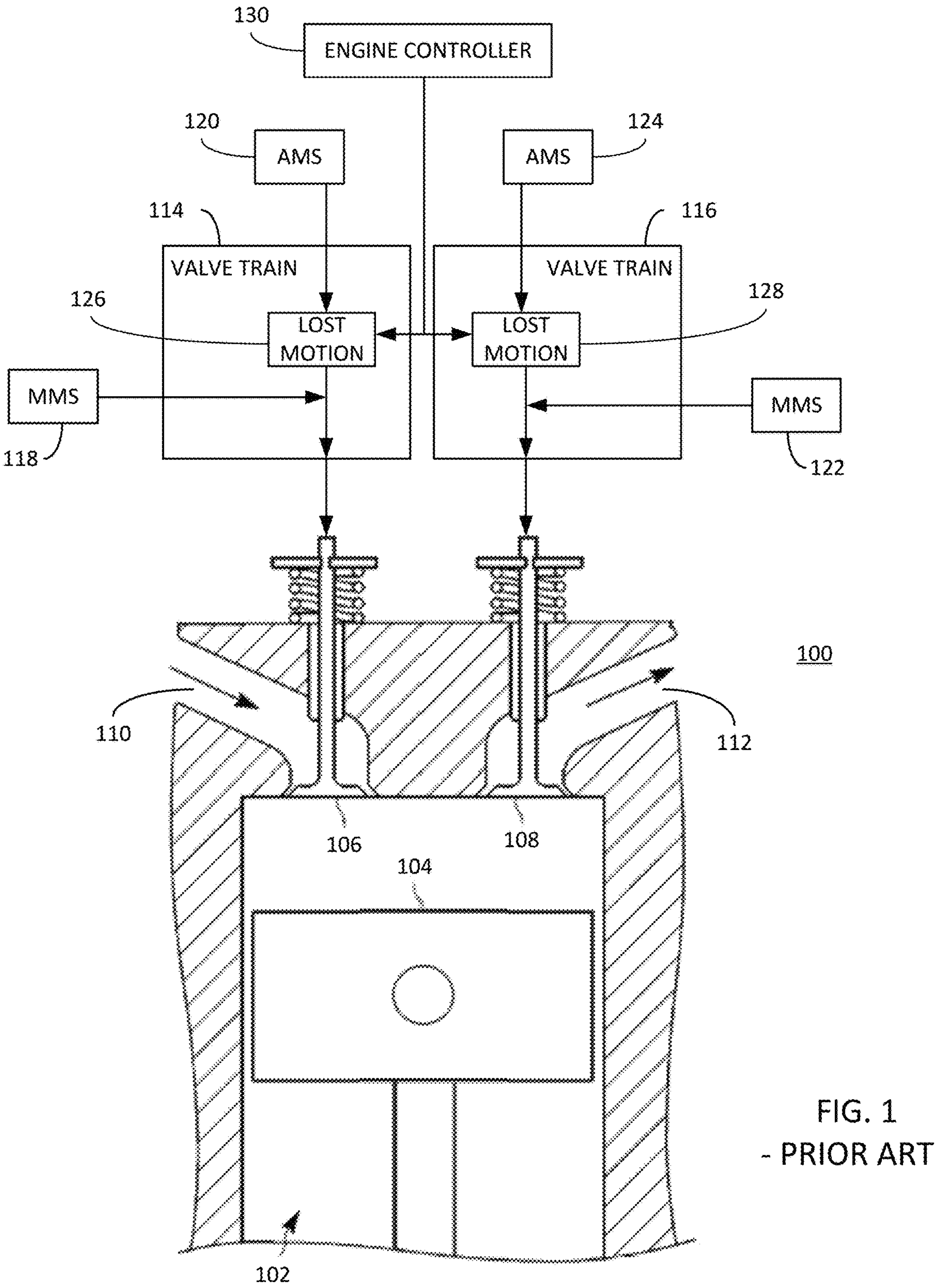
FIG. 1 is a schematic, partial cross-sectional illustration of an internal combustion engine illustrating a typical valve actuation system in accordance with prior art techniques.
Figure 2:
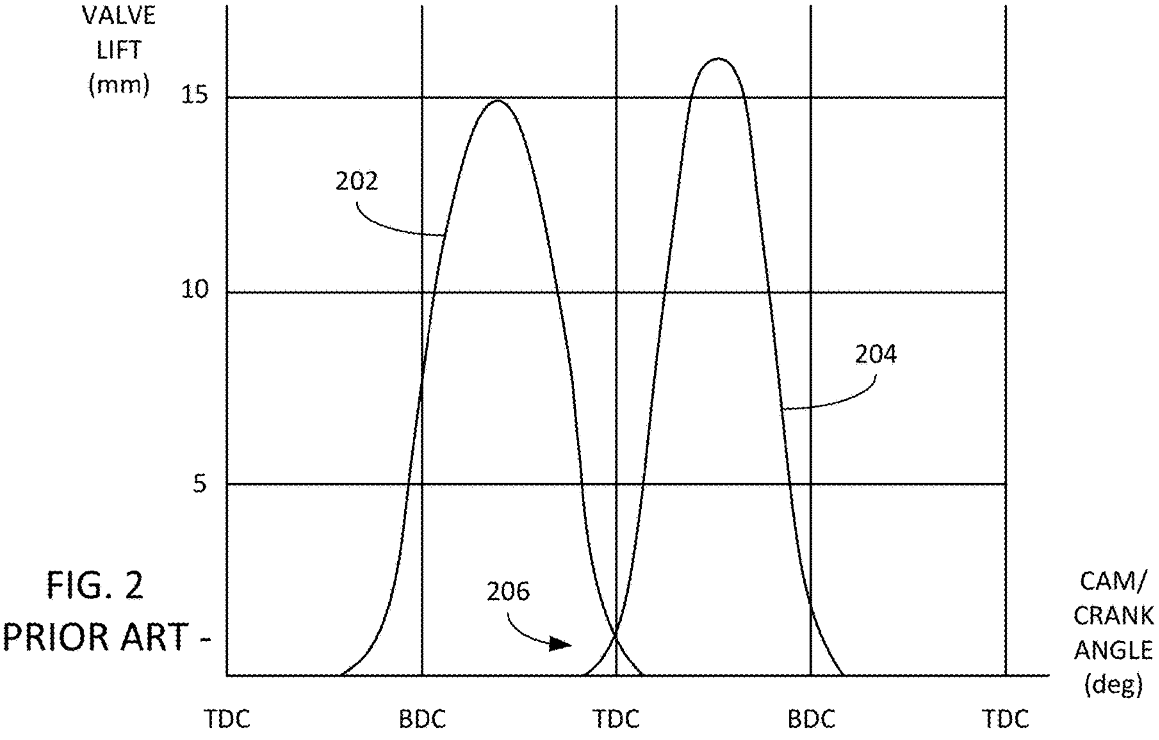
FIG. 2 illustrates main exhaust and intake valve event lift curves in accordance with prior art techniques.
Figure 3:
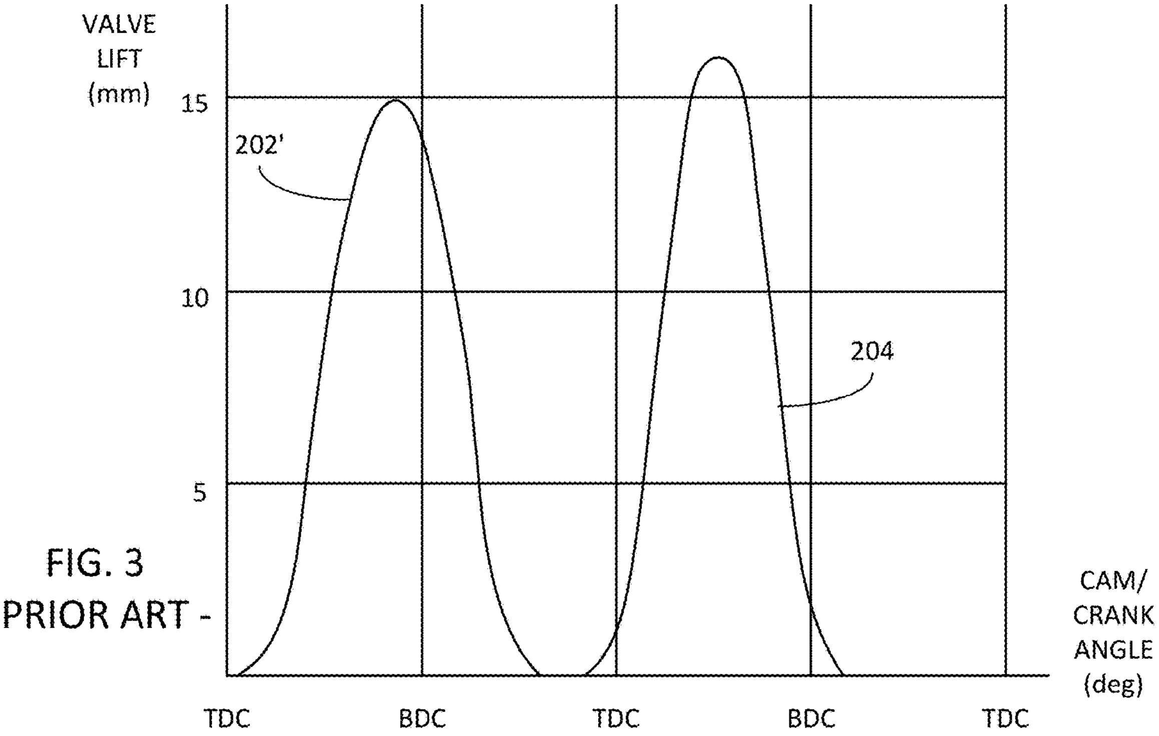
FIG. 3 illustrates a phase shifted main exhaust valve event lift curve relative to a main intake valve event lift curve in accordance with prior art techniques.
Figure 4:
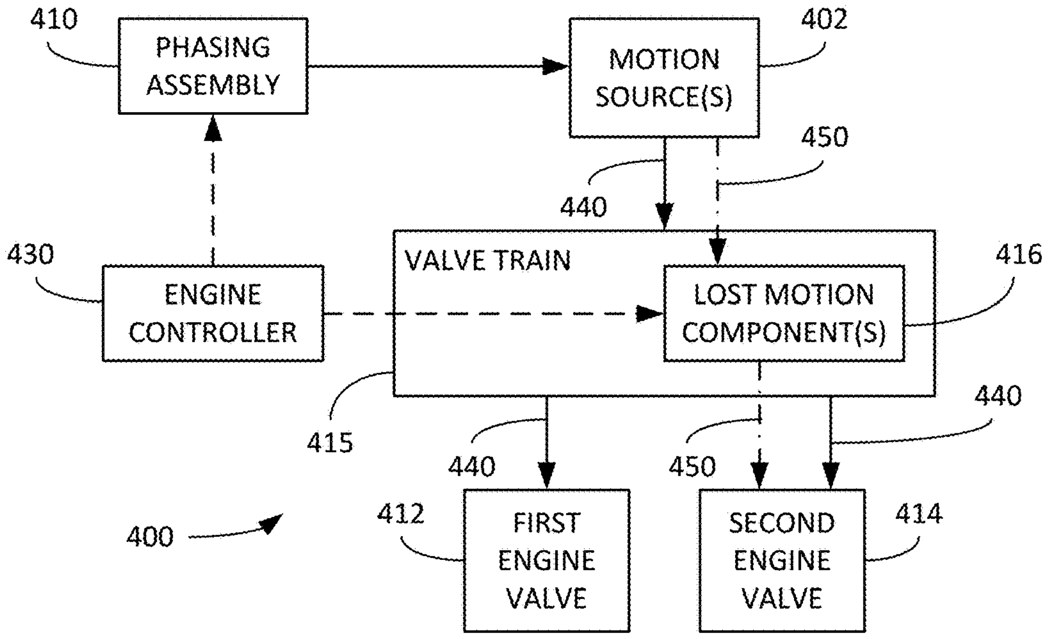
FIG. 4 schematically illustrates an embodiment of a valve actuation system for providing a recompression relief valve event in accordance with the instant disclosure.

FIG. 4 is a schematic illustration of an embodiment of a valve actuation system 400 for achieving aspects of the instant disclosure. The valve actuation system 400 includes one or more motion sources 402 that comprise, for example, one or more cams each of which comprises one or more lobes for achieving desired valve events as described in greater detail below. In all embodiments described herein, the one or more motion sources 402 provide at least a main exhaust valve event 440 (illustrated herein using solid lines) and a recompression relief valve event 450 (illustrated herein using dashed and dotted lines). A phasing assembly

410 is provided and operatively connected to at least one of the one or more motion sources 402. The phasing assembly 410 may include those components used to adjust timing (phase) of one or more of the motion sources 402 as well as peripheral devices employed to control the phasing components. For example, and by way of simplified explanation, the phasing assembly 410 may comprise a stator and rotor arrangement giving rise to opposing hydraulic cavities that permit the selective rotation and hydraulic locking of the rotor relative to the stator. The rotor, in turn, is connected to a camshaft comprising the motion source(s) to be adjusted. In this case, the phasing assembly 410 may also comprise one or more solenoids for providing hydraulic fluid (e.g., engine oil) to, or evacuating hydraulic fluid from, the hydraulic cavities formed by the stator/rotor components. Such solenoids may be operated, in turn, by an engine controller 430 comprising a suitable processing device such as a microprocessor, microcontroller, etc. operating in accordance with stored instructions, as known in the art.

The valve events 440, 450 provided by the at least one motion source 402 are provided to first and second engine valves 412, 414 via a valve train 415. In an embodiment, both the first and second engine valves 412, 414 are exhaust valves. As known in the art, the valve train 415 may comprise one or more components used to convey the valve events 440, 450 from the motion source(s) 402 to the engine valves 412, 414 such as, but not limited to, tappets, pushrods, rocker arms (such as end-pivoting Type II rocker arms and/or center-pivoting Type III rocker arms), valve bridges, etc. Furthermore, though shown as a unitary structure in FIG. 4 (as well as various other ones of the instant Figures), the valve train 415 may be configured such that separate paths for valve events are provided for corresponding ones of the first and second engine valves 412, 414, as further described in some embodiments below.

The valve train 415 comprises one or more lost motion components 416 (as described above) used to selectively convey at least the recompression relief valve event 450 to one of the engine valves (the second engine valve 414 in the illustrated example). Once again, operation of the lost motion components(s) 416 may be handled by the engine controller 430 as mediated by one or more intervening hydraulic components such as solenoids (not shown), as known in the art.

In the embodiment of FIG. 4, the at least one motion source 402 comprises a first motion source configured to provide the exhaust main valve event 440. In turn, the phasing assembly 410 is operatively connected to the first motion source such that phase of the first motion source and, therefore, the exhaust main valve event 440, may be advanced (or retarded) as desired. The at least one motion source 402 is also configured (via the first motion source or another motion source, as described below) to provide the recompression relief valve event 450 to the lost motion component(s) 416 (possibly via one or more intervening components in the valve train 415). In an embodiment, when the phasing assembly is operated to advance the phase of the main exhaust valve event 440, thereby eliminating overlap between the main exhaust and intake valve events as described above, the lost motion component(s) 416 is(are) controlled such that the recompression relief valve event 450 is presented to at least one of the two engine valves 412, 414.

As described herein, a recompression relief valve event is a valve event provided in addition to an advanced main exhaust valve event so as to eliminate, or at least minimize, recompression of the cylinder that might otherwise occur due to advancement of the main exhaust valve event. In various embodiments, the recompression relief valve event may be provided independent of the main exhaust valve event or may be integrated with the main exhaust event for selective application. In various examples illustrated herein, the recompression relief valve events are configured such that they will overlap with at least a portion of a main intake valve event, though it is appreciated that this is not a requirement. That is, in some implementations, it may be sufficient for the recompression relief valve event to cause opening of the exhaust valve only until a short time prior to onset of the main intake valve event (i.e., no overlap), provided that the recompression relief valve event sufficiently reduces cylinder pressure.

As described in conjunction with various ones of the further embodiments herein, the at least one motion source 402 may be configured to provide not only the main exhaust and recompression relief valve events 440, 450, but also auxiliary valve events as noted above. Such auxiliary valve events may be provided by a motion source separate from those motion sources providing the main exhaust valve event and recompression relief valve event, or may be provided by a motion source that also provides the main exhaust valve event or recompression relief valve event. As will be recognized based on various embodiments described below, aspects of the instant disclosure may provide a secondary function of recompression relief in an internal combustion engine already configured to provide auxiliary valve events to effectuate, for example, a compression-release engine braking operation. Thus, aspects of the disclosure can be achieved at relatively low cost, for example, by providing modified motion sources (cams) on existing engine braking mechanisms, and without major overhaul of an engine environment.

Figure 5:
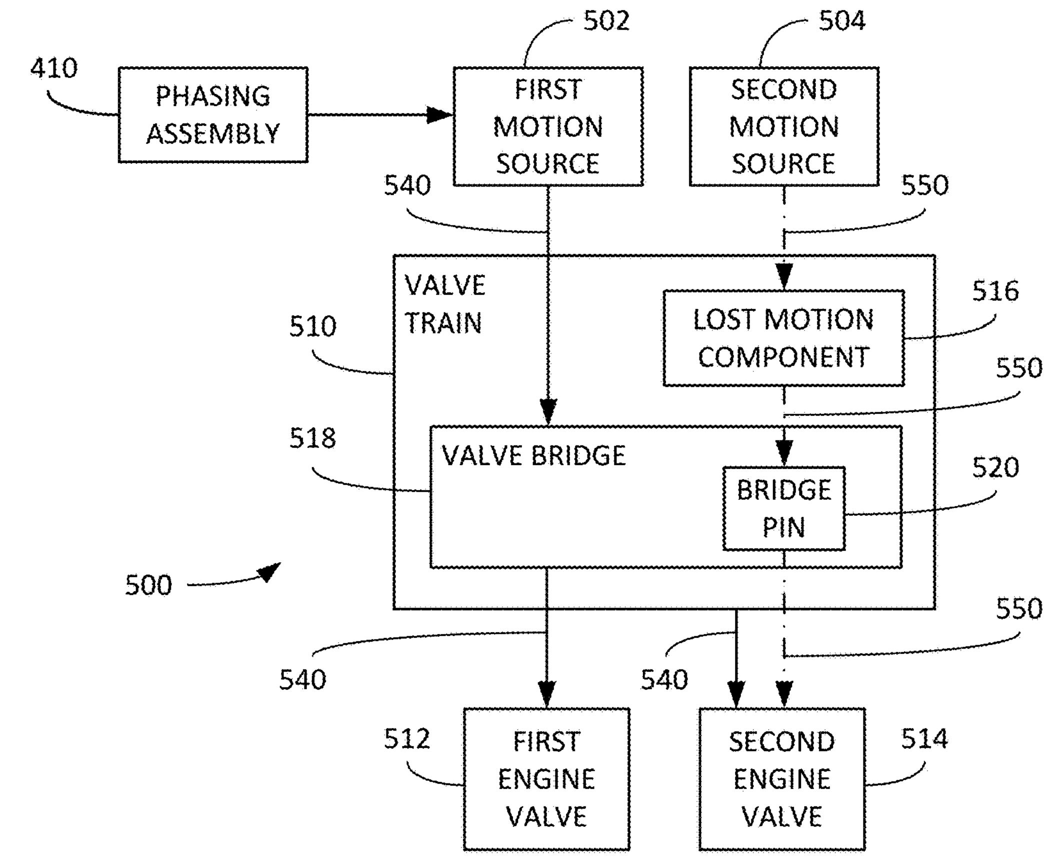
FIG. 5 schematically illustrates a first specific embodiment of a valve actuation system for providing a recompression relief valve event in accordance with the instant disclosure.

Referring now to FIG. 5, a schematic illustration of a first specific embodiment of a valve actuation system is shown. Like the system 400 shown in FIG. 4, the valve actuation system 500 of this first specific embodiments comprises a valve train 510 configured to convey valve actuation motions to first and second engine valve 512, 514. In this case, valve actuation motions are provided by a first motion source 502 and a second motion source 504 separate from the first motion source 502. For example, in the case of cams used to implement the first and second motion sources 502, 504, such cams would be physically distinct cams. In this embodiment, main exhaust valve events 540 are provided by the first motion source 502, whereas recompression relief valve events 550 are provided by the second motion source 504. As shown, a phasing assembly 410 is operatively connected to the first motion source 502.

As further shown, in this embodiment, the valve train 510 comprises, in addition to a lost motion component 516, a valve bridge 518 configured to provide the main exhaust valve events 540 received from the first motion source 502 to both the first and second engine valves 512, 514 and a bridge pin 520 configured to receive recompression relief valve events 550 from the lost motion component 516 to be conveyed to the second engine valve 514. Such valve bridges 518 and bridge pins 520 are known to those skilled in the art. For example, the system 500 illustrated in FIG. 5 may be implemented with a first rocker arm configured to convey the main exhaust valve events 540 from the first motion source 502 to the valve bridge 518 and a second (or dedicated) rocker arm comprising the lost motion component 516 configured to align with the bridge pin 520 and second engine valve 514. Through selective operation of the lost motion component 516, the recompression relief valve events 550 received from the second motion source 504 may be likewise selectively conveyed to the bridge pin 520 and second engine valve. In an alternative embodiment, rather than a second rocker arm for conveyance of the recompression relief valve events 550, a bolt-on housing or overhead assembly, as known in the art, may be provided to convey the recompression relief valve events 550 to the bridge pin 520.

Figure 6:
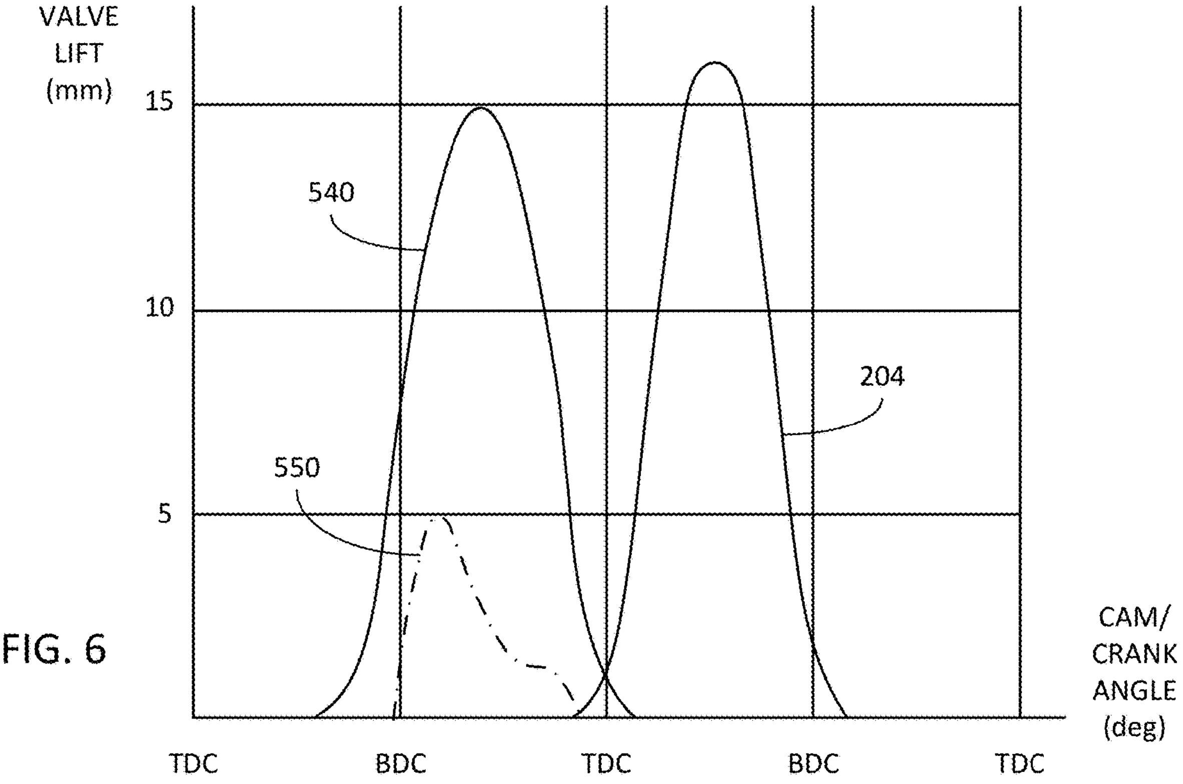
FIGS. 6 and 7 illustrate main valve event lift curves and a recompression relieve valve event lift curve resulting from the system of FIG. 5 during respective unadvanced (fully retarded) and advanced phases of a main exhaust valve event in accordance with the instant disclosure.
Figure 7:
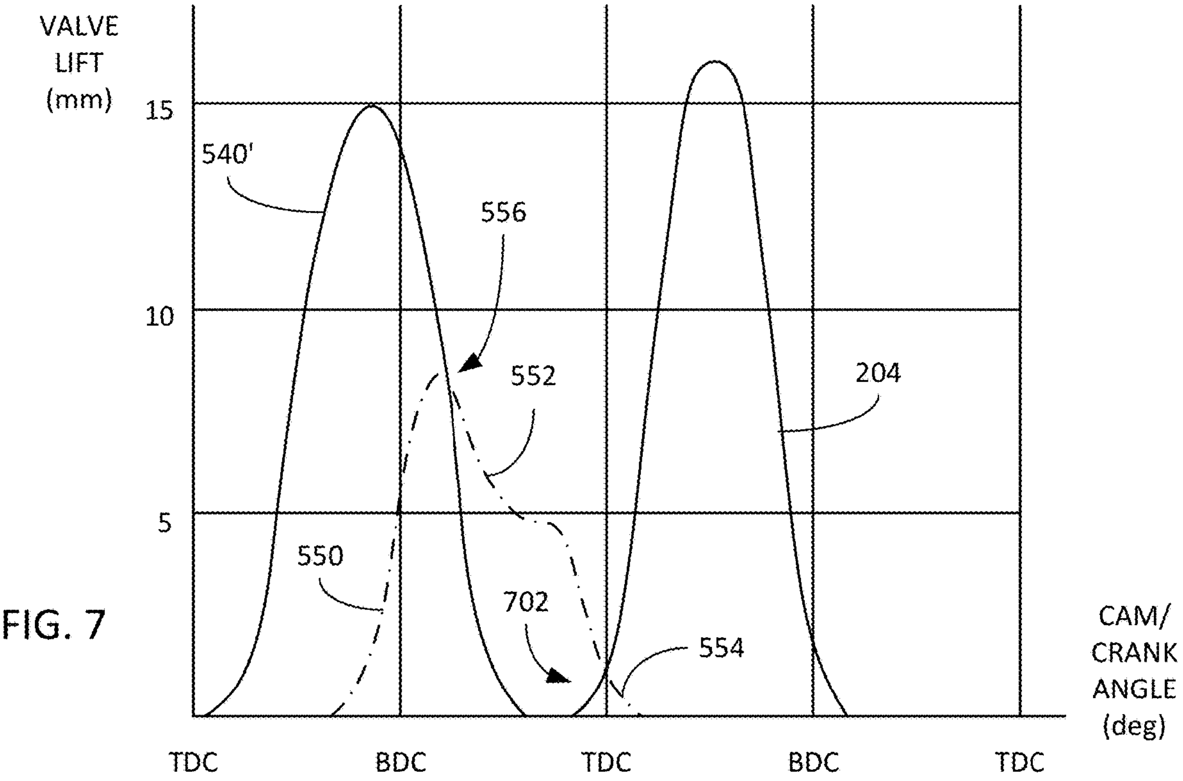

Under control of an engine controller (not shown in FIG. 5 for ease of illustration), coordinated operation of the phasing assembly 410 and lost motion component 516 can be used to provide the valve events illustrated in FIGS. 6 and 7. In particular, FIG. 6 illustrates a state in which the phasing assembly 410 is controlled to leave the main exhaust valve event 540 is in its full retarded (i.e., un-advanced) state and the lost motion component 516 is controlled to remain in its retracted/compliant/unlocked state such that the illustrated recompression relief valve event 550 is not fully conveyed. As shown, in this state, the recompression relief valve event 550 is entirely "hidden" or encompassed by the fully retarded main exhaust valve event 540, thereby prevent the recompression relief valve event 550 from actuating the second engine valve 514.

On the other hand, FIG. 7 illustrates a state in which the phasing assembly 410 is controlled to provide an advanced main exhaust valve event 540' and the lost motion component 516 is controlled to assume its extended/rigid/locked state, thereby causing full conveyance of the recompression relief valve event 550. As shown, the recompression relief valve event 550 comprises a tail or back-end portion 554 configured to provide an overlap region 702 with a main intake valve event 204, thereby preventing recompression of the cylinder that might otherwise develop due to the advanced main exhaust valve event 540'. In embodiments in which the recompression relief valve event is separate from and therefore added to the main exhaust valve event, as in the case of FIG. 5-7, the recompression relief valve event 550 preferably comprises a transition region 552 having slope sufficiently matching a slope of a back side portion the advanced main exhaust valve event 540', thereby minimizing any impacts that might otherwise occur at a handoff point 556 from the advanced main exhaust valve event 540' to the recompression relief valve event 550.

Figure 8:
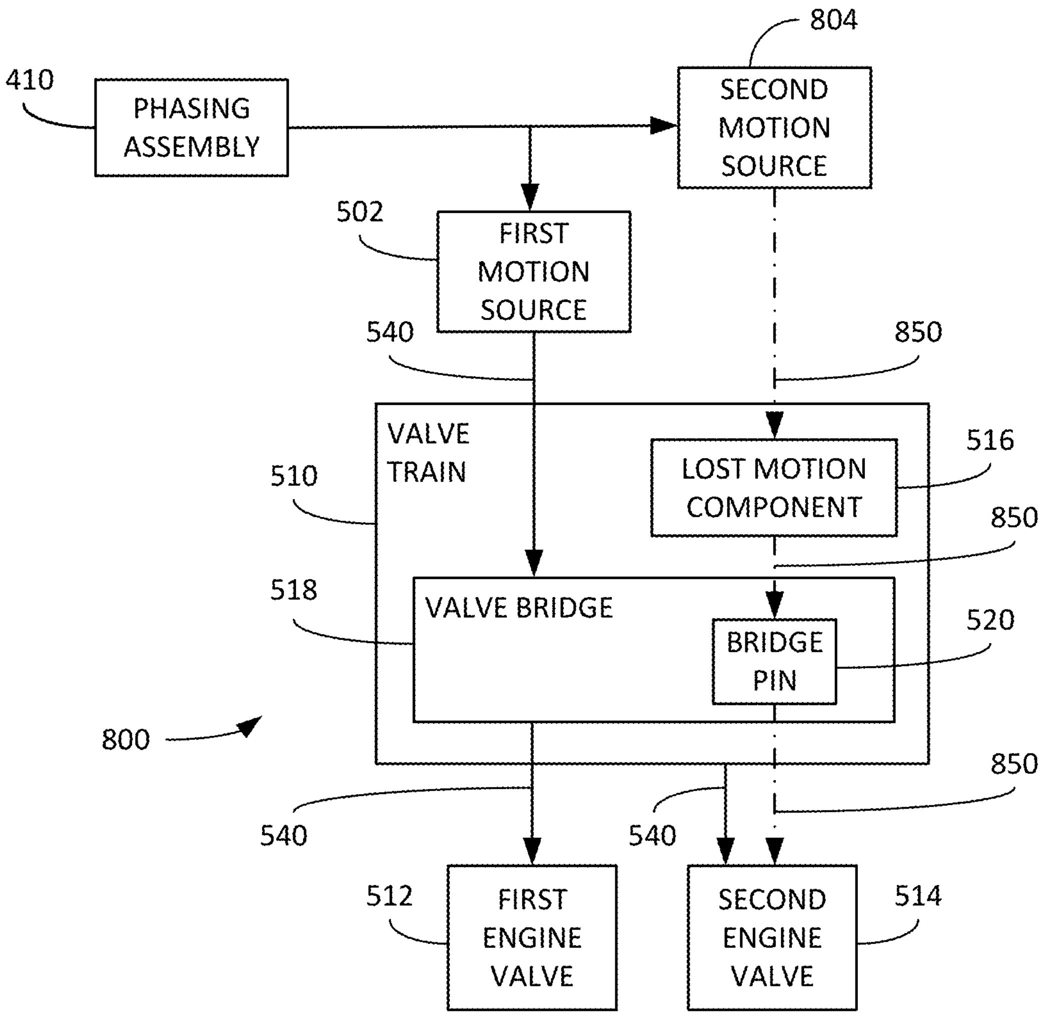
FIG. 8 schematically illustrates a second specific embodiment of a valve actuation system for providing a recompression relief valve event in accordance with the instant disclosure.

Referring now to FIG. 8, a second specific embodiment of a valve actuation system 800 substantially similar to the system 500 illustrated in FIG. 5 is shown, including a second motion source 804, separate from the first motion source 502, and configured to provide recompression relief valve events 850. However, unlike the system 500 of FIG. 5, the system 800 of the second specific embodiment has the phasing assembly 410 operatively connected to both the first motion source 502 and a second motion source 804. As a result of this arrangement, the recompression relief valve event 850 will advance in the same manner as the main exhaust valve event 540 under control of the phasing assembly 410. An example of this is shown in FIGS. 9 and 10.

Figure 9:
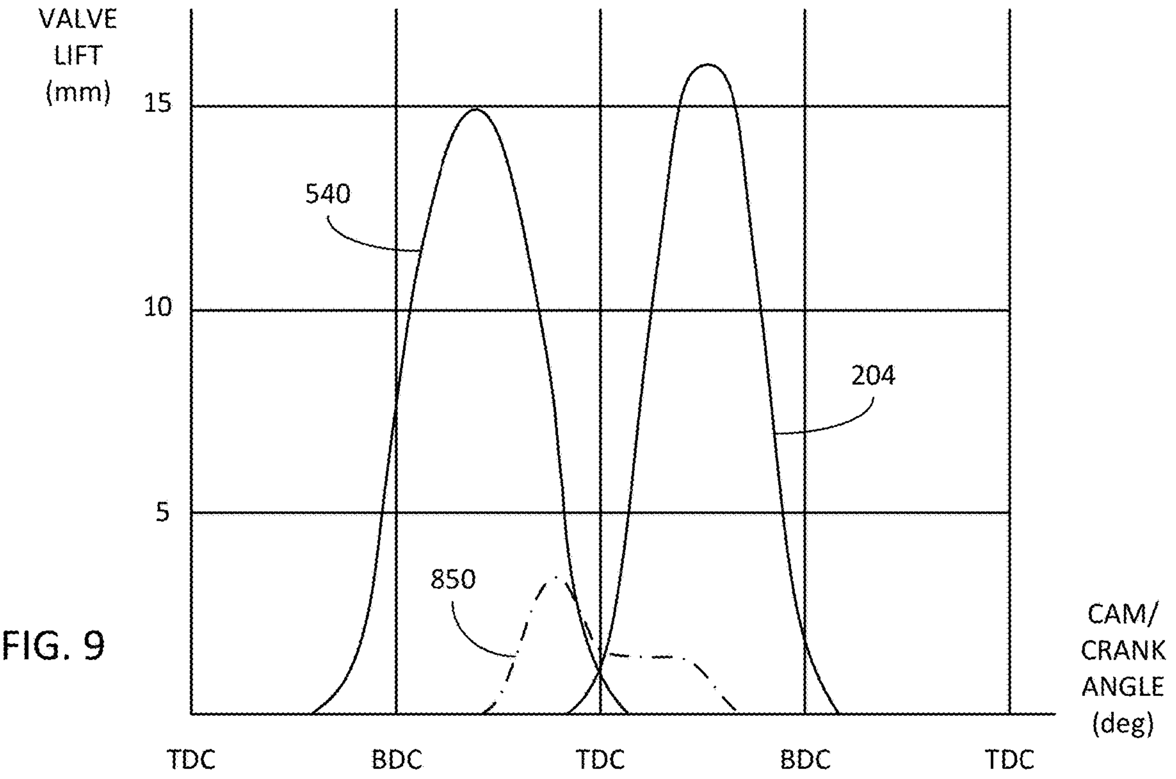
FIGS. 9 and 10 illustrate main valve event lift curves and a recompression relieve valve event lift curve resulting from the system of FIG. 8 during respective unadvanced (fully retarded) and advanced phases of a main exhaust valve event in accordance with the instant disclosure.

FIG. 9 shows the typical relationship between the main exhaust valve event 540 and the main intake valve event 204. However, for the sake of comparative illustration only, FIG. 9 also illustrates the recompression relief valve event 850 as it would appear if the main exhaust valve event 540 was not advanced and the lost motion component 516 was maintained in its extended/rigid/locked state, i.e., such that the recompression relief valve event 850 is not lost but is instead conveyed to the second engine valve 514 at the same time as the main exhaust valve event 540. (In typical operation, the lost motion component 516 would not operate to convey the recompression relief valve event 850 when the main exhaust valve event 540 has not been advanced.) In the illustrated example, the recompression relief valve event 850 has a comparatively low peak amplitude of approximately 3.5 mm (as compared to the relatively large peak amplitude of the recompression relief valve event 550 illustrated in FIG. 7), which may be more readily lost in its entirety by the lost motion component 516.

Figure 10:
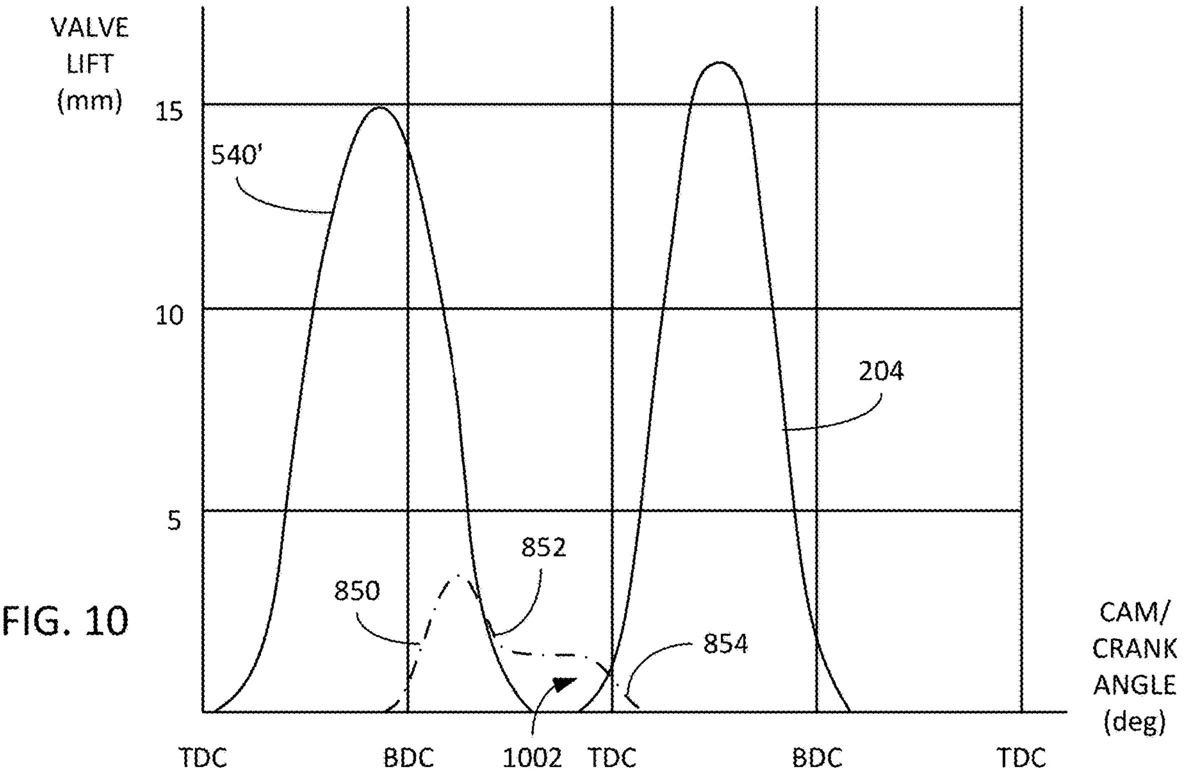

As shown in FIG. 10, when the main exhaust valve event 540 is advanced and the lost motion component 516 is operated to convey the recompression relief valve event 850, the fact that the second motion source 804 is also commanded by the phasing assembly 410 results in the recompression relief valve event 850 also being advanced so as to cooperate with the advanced main exhaust valve event 540'. Once again, as shown, the recompression relief valve event 850 comprises a transition region 852 configured to minimize impacts as described above, and a tail region 854 providing an overlap region 1002 with the main intake valve event 204.

It is noted that the embodiment illustrated in FIG. 8 may be implemented in a similar manner as described above relative to FIG. 5, i.e., using a first rocker arm and a second (dedicated) rocker arm, or a first rocker arm in combination with an overhead assembly.

Figure 11:
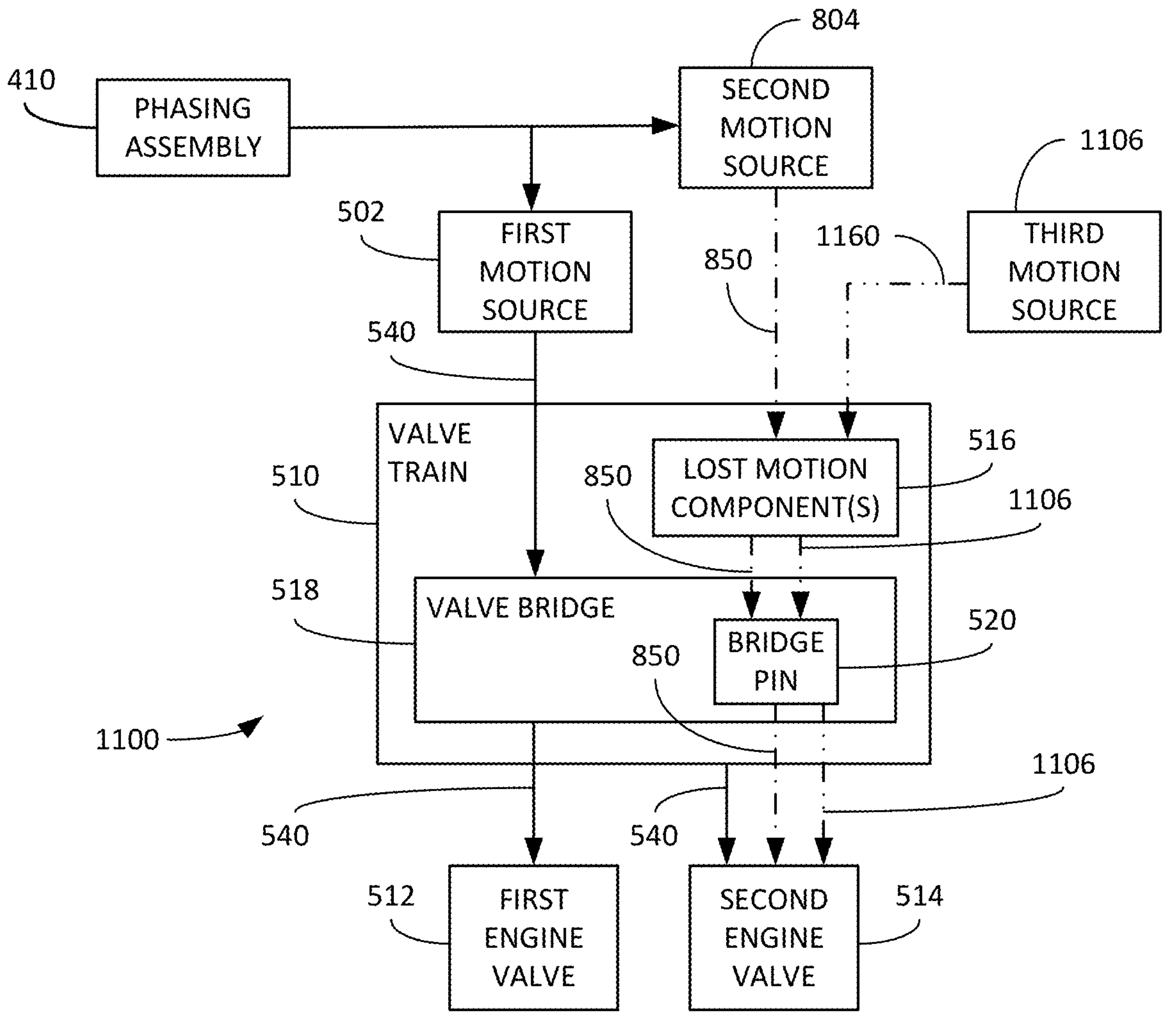
FIG. 11 schematically illustrates a variant of the second specific embodiment of FIG. 8 in accordance with the instant disclosure.

Referring now to FIG. 11, a variant of the second specific embodiment of FIG. 8 is schematically illustrated. In this variant, the valve actuation system 1100 comprises a third motion source 1106 configured to provide auxiliary valve events 1160. For example, such auxiliary valve events 1160 could comprise compression-release engine braking valve events, as known in the art. It is appreciated that still other auxiliary valve events, instead of or in addition to such compression-release engine braking valve events could be provided by the third motion source 1106. As shown, the auxiliary valve events 1160 are provided to a lost motion component 516, which may be the same lost motion component used to selectively convey the recompression relief valve event 850 or an additional lost motion component. It is noted that, unlike the first and second motion sources 502, 804, the third motion source 1106 is not operatively connected to, and therefore not commanded by, the phasing assembly 410.

Figure 12:
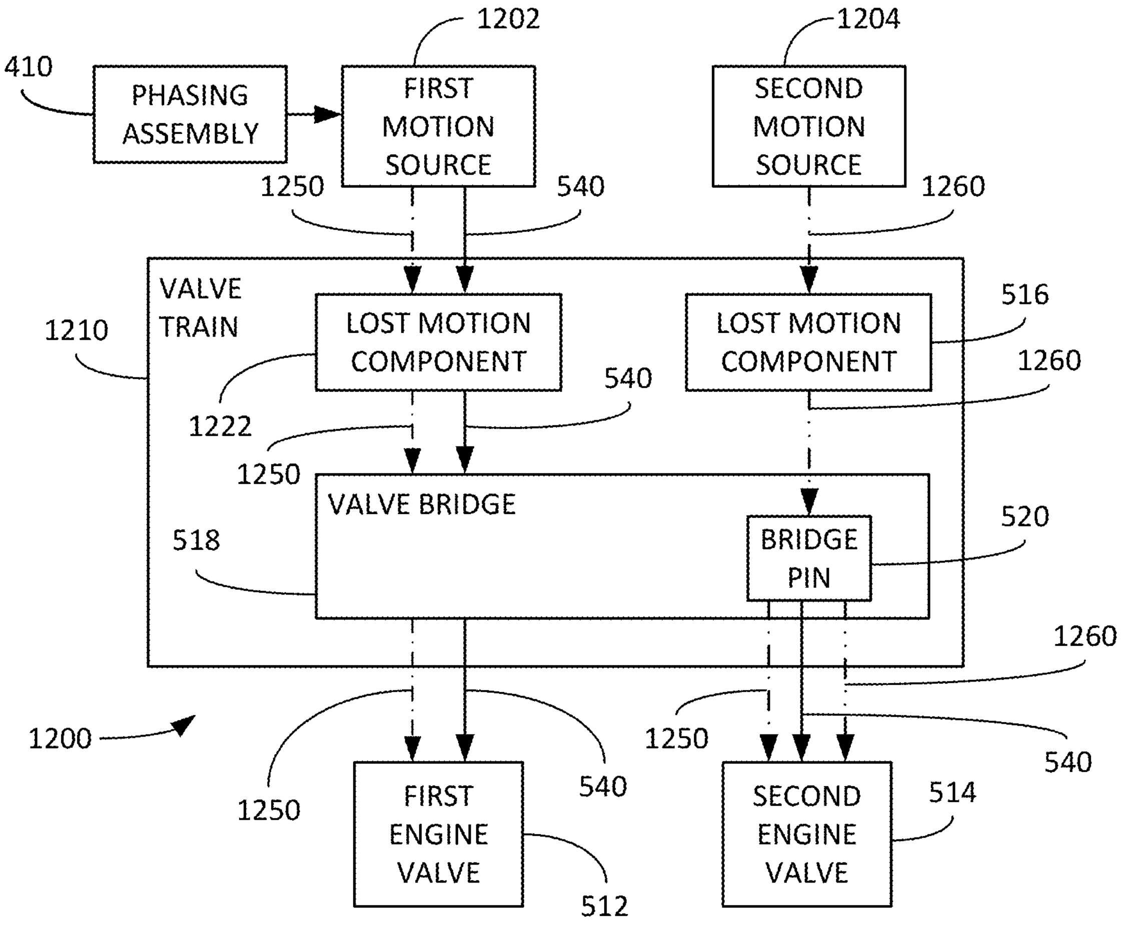
FIG. 12 schematically illustrates a third specific embodiment of a valve actuation system for providing a recompression relief valve event in accordance with the instant disclosure.

Referring now to FIG. 12, a third specific embodiment of a valve actuation system 1200 is shown. Similar to the first and second specific embodiments shown in FIG. 5, the valve actuation system 1200 of FIG. 12 includes a first and a second motion source 1202, 1204, where only the first motion source 1202 is operatively connected to and commanded by the phasing assembly 410. However, in this case, the first motion source 1202 is configured to provide the main exhaust valve event 540 and the recompression relief valve event 1250, whereas the second motion source is configured to provide one or more auxiliary valve events 1260. In this case, the first motion source 1202 may comprise a so-called lost motion cam. As known in the art, and with reference to FIG. 12A, a lost motion cam 1270, when coupled with a lost motion component, may be used to selectively provide valve events residing above a base circle level 1272 or valve events residing below the base circle 1272 but above a sub-base circle level 1274 (in addition to those above the base circle 1272). When the lost motion component is, for example, in a retracted state, only valve events above the base circle 1272 are conveyed via the valve train, i.e., any valve events below the base-circle 1272 are lost. On the other hand, when the lost motion component is in an extended state, the valve train is expanded such that valve events at or above the sub-base circle 1274 are received and conveyed by the valve train. Thus, in the illustrated example, the lost motion cam 1270 comprises a first cam lobe 1242 configured to provide the main exhaust valve event 540 and a second cam lobe 1252 configured to provide the recompression relief valve event 1250. It is noted that the second cam lobe 1252 is configured to seamlessly transition from the second cam lobe 1252 such that the recompression relief valve event 1250 will be effectively integrated with the main exhaust valve event 540.

As further shown in FIG. 12, a valve train 1210 is configured to with the valve bridge 518 and bridge pin 520, as in previous embodiments. However, in this case, while the second motion source 1204 is operatively connected to second engine valve 514 via the first lost motion component 516 and bridge pin 520, the first motion source 1202 is operatively connected to the valve bridge 518 (and, therefore, the first and second engine valves 512, 514) via a second lost motion component 1222. For example, the second lost motion component 1222 may be implemented as an actuator e-foot deployed within a first rocker arm configured to make contact with a center point of the valve bridge 518, as known in the art.

Figure 13:
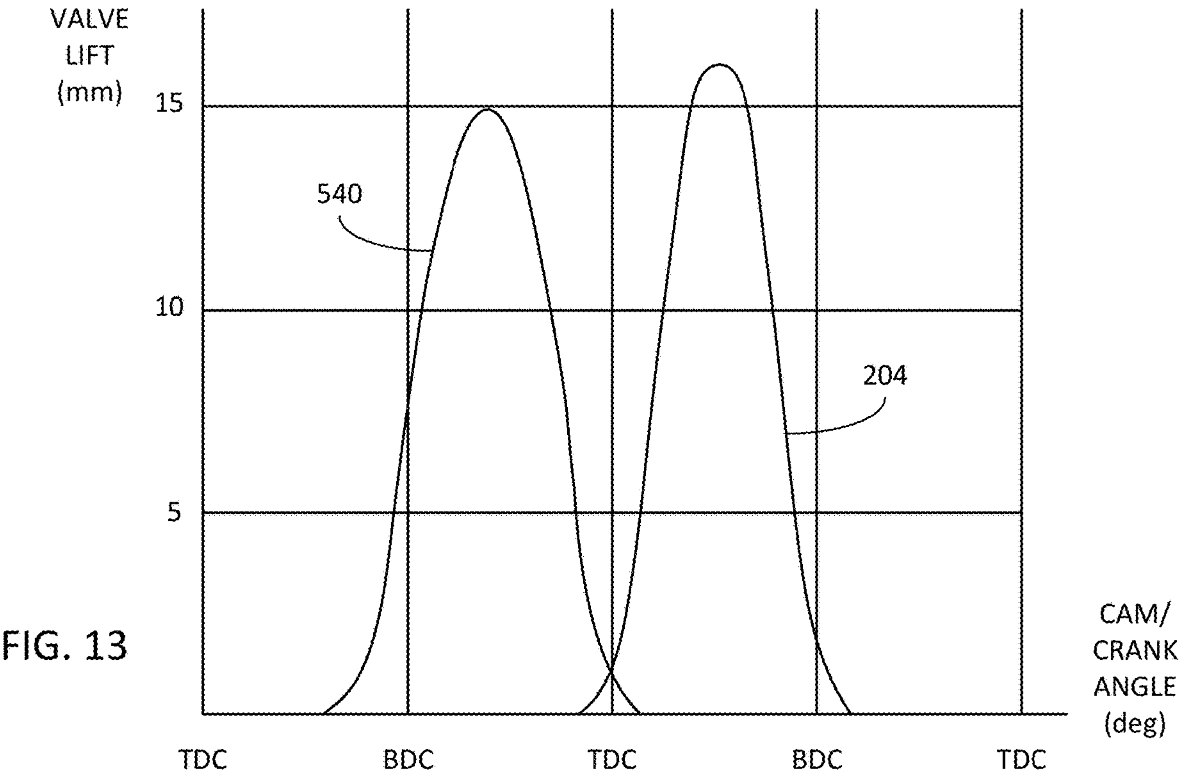
FIGS. 13 and 14 illustrate main valve event lift curves and a recompression relieve valve event lift curve resulting from the system of FIG. 12 during respective unadvanced (fully retarded) and advanced phases of a main exhaust valve event in accordance with the instant disclosure.
Figure 14:
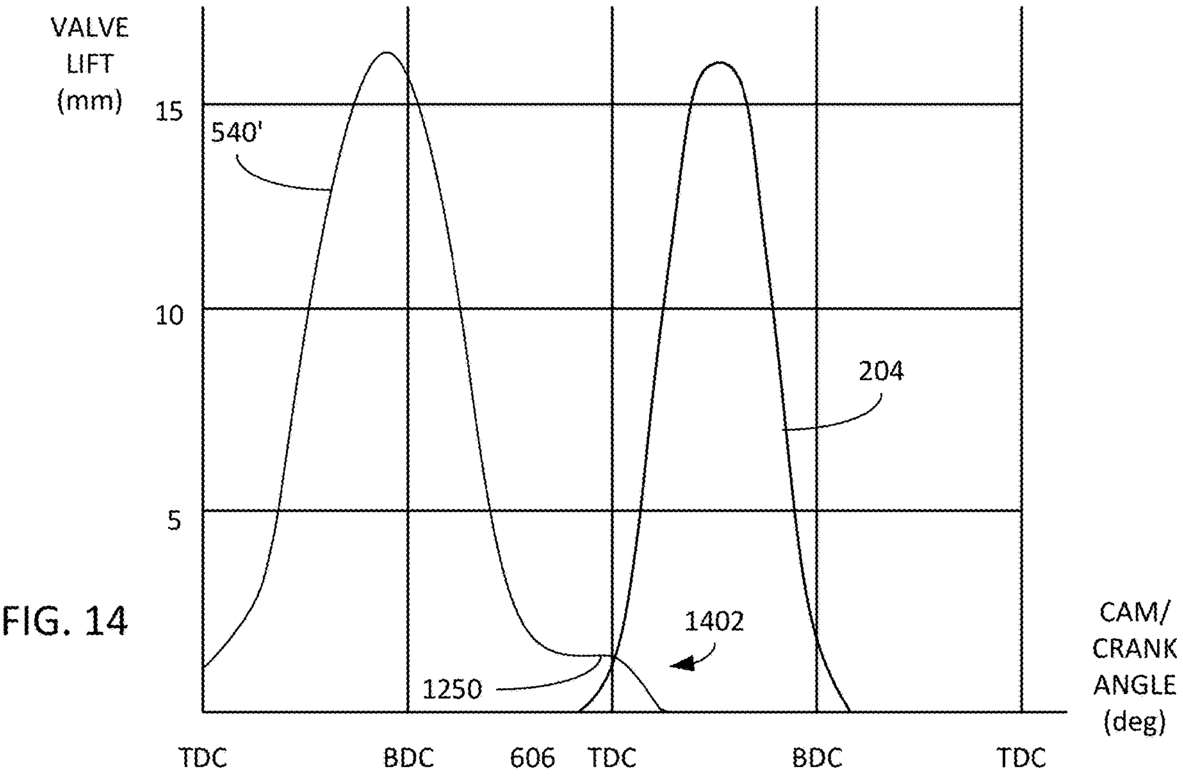
Figure 15:
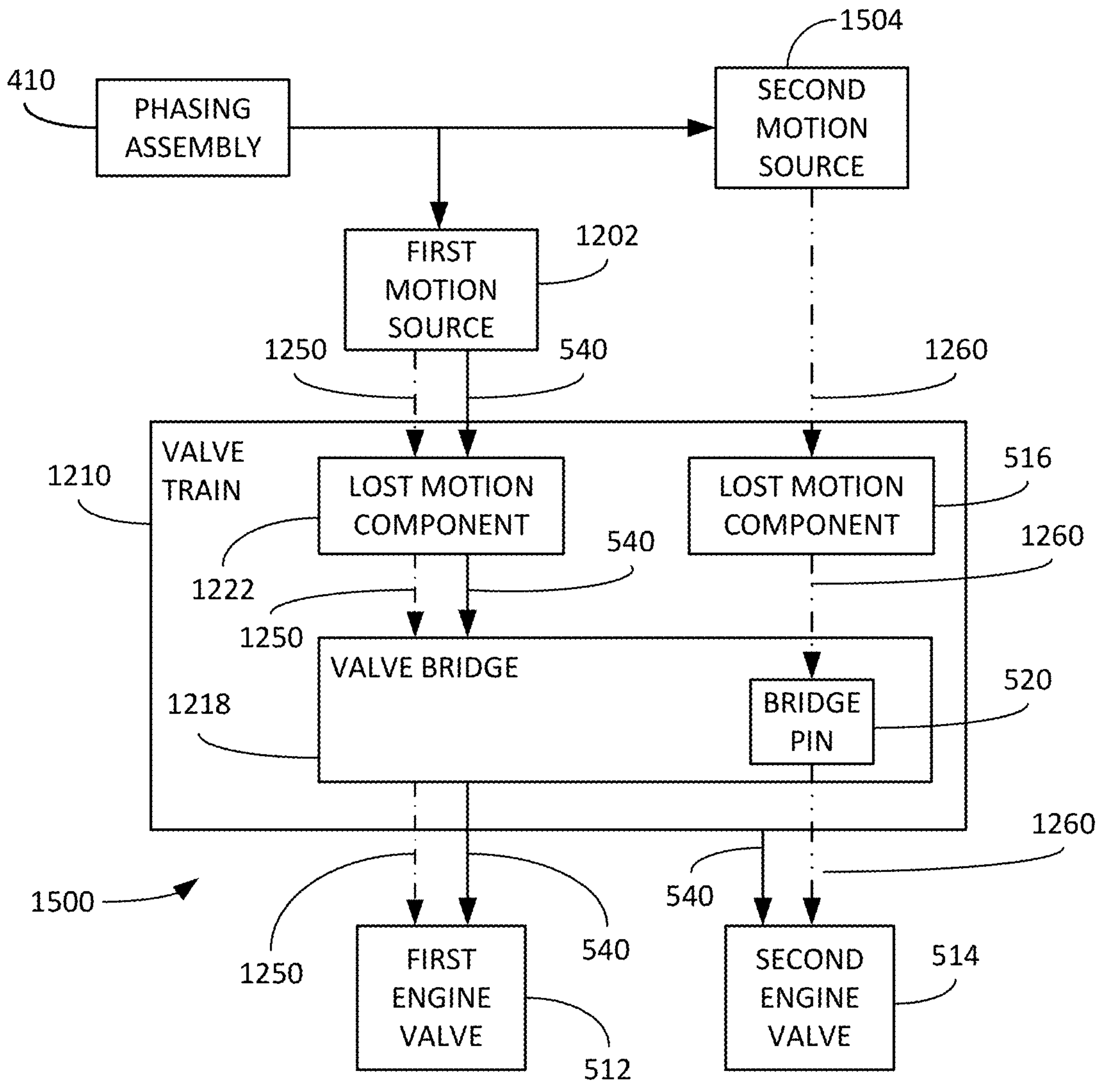
FIG. 15 schematically illustrates a variant of the third specific embodiment of FIG. 12 in accordance with the instant disclosure.

When operating in a positive power mode, both the first and second lost motion components are maintained in their retracted/compliant/unlocked states such that the main exhaust valve events 1250 are applied to the first and second engine valves 512. This operating condition is illustrated in FIG. 13 showing the typical timing of the main exhaust valve event 540 and the main intake valve event 204. When the main exhaust valve event 540 is advanced, the second lost motion component 1222 is operated in its extended/rigid/locked state such that the previously-lost recompression relief valve event 1250 is now conveyed via the second lost motion component 1222 and valve bridge 518. As shown in FIG. 14, in addition to the presence of the recompression relief valve event 1250, the advanced main exhaust valve event 540' now has increased peak lift as compared to the fully retarded main exhaust valve event 540 due to the increased length of the second lost motion component 1222. As described above and shown in FIG. 14, the recompression relief valve event 1250 is integrated with the advanced main exhaust valve event 540' and thus does not give rise to an explicit handoff point, as with prior embodiments. However, similar to prior embodiments, the recompression relief valve event 1250 once again gives rise to an overlap region 1402 with the main intake valve event 204.

With reference once again to FIG. 12, the first lost motion component 516 may be operated independently of the second lost motion component 1222. In this manner the auxiliary valve events 1260 may be selectively applied to the second engine valve 514 while the main exhaust valve events 540 are applied to both the first and second engine valves 512, 514, or when the combination of the main exhaust valve events 540 with the recompression relief valve events 1250 is applied to both the first and second engine valves 512, 514.

Figure 12A:
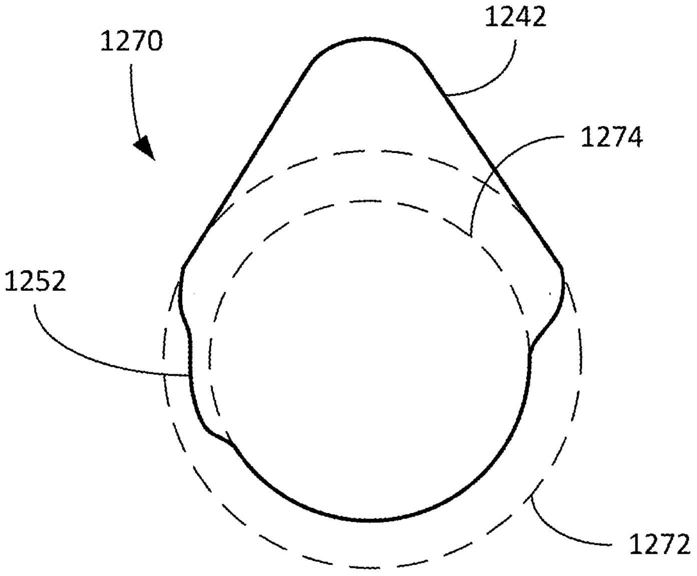
FIG. 12A is a side view of an example of a first motion source that may be used in conjunction with the embodiment of FIG. 12.
Figure 16:
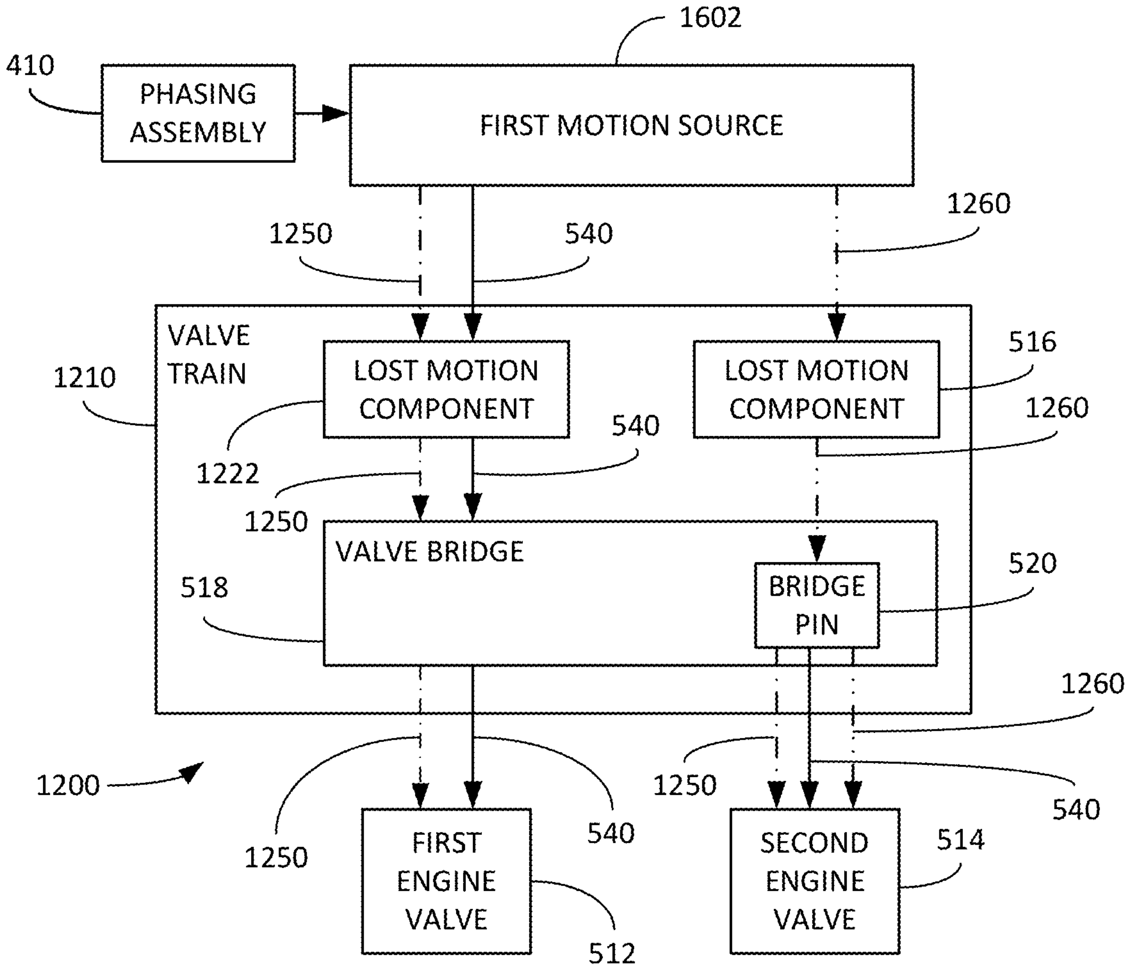
FIG. 16 schematically illustrates a fourth specific embodiment of a valve actuation system for providing a recompression relief valve event in accordance with the instant disclosure.

Referring now to FIG. 16, a fourth specific embodiment of a valve actuation system 1600 is schematically illustrated. In this case, the valve actuation system 1600 is substantially similar the system 1200 depicted in FIG. 12. In this case, however, the main exhaust valve events 540, recompression relief valve events 1250 and auxiliary valve events 1260 are all provided by the first motion source 1602. Thus, for example, the first motion source 1602 would again comprise a lost motion cam 1270 as shown in FIG. 12A, but with additional cam lobes configured to provide the auxiliary valve events 1260. Because the first motion source 1602 is operatively connected to, and therefore commanded by the phasing assembly 410, any phase advancement applied to the main exhaust valve events 1250 would necessarily be applied to the recompression relief valve event 1250 (in a manner similar to the embodiment of FIG. 12).

A modified form of a so-called integrated rocker brake (IRB), i.e., a single rocker arm configured to provide both main valve events and compression-release valve events as known in the art, could be employed in the valve train 1210 to convey the valve events 540, 1250, 1260. Here, the first lost motion component 516 could be a lost motion actuator in the IRB configured to actuate a single engine valve, in this case according to the auxiliary valve events 1260. On the other hand, the second lost motion component 1222 could be a lost motion actuator in the IRB configured to actuate both the first and second engine valves 512, 514, in this case according to the main valve events 540 and recompression relief valve events 1250.

In this embodiment, the first and second lost motion components 516, 1222 would be operated separately (e.g., using separate hydraulic paths provided within the valve train 1210) so as to provide separate modes of operation based on the main exhaust valve events 540. Thus, the first lost motion component 516 would be operated in its extended/rigid/locked state when it is desired to add auxiliary valve events 1260 (e.g., engine braking) while the second lost motion component 1222 is maintained in its retracted/compliant/unlocked state, thereby conveying only main exhaust valve events 540. On the other hand, when phase of the main exhaust valve events 540 has been advanced by the phasing assembly 410, the first lost motion component 516 would be operated in its retracted/compliant/unlocked state thereby preventing conveyance of any additional valve events to the second engine valve, whereas the second lost motion component 516 would be operated in its extended/rigid/locked state so as to convey both the advanced main exhaust valve events 540' and the recompression relief valve events 1250 to both the first and second engine valves 512, 514.

Figure 17:
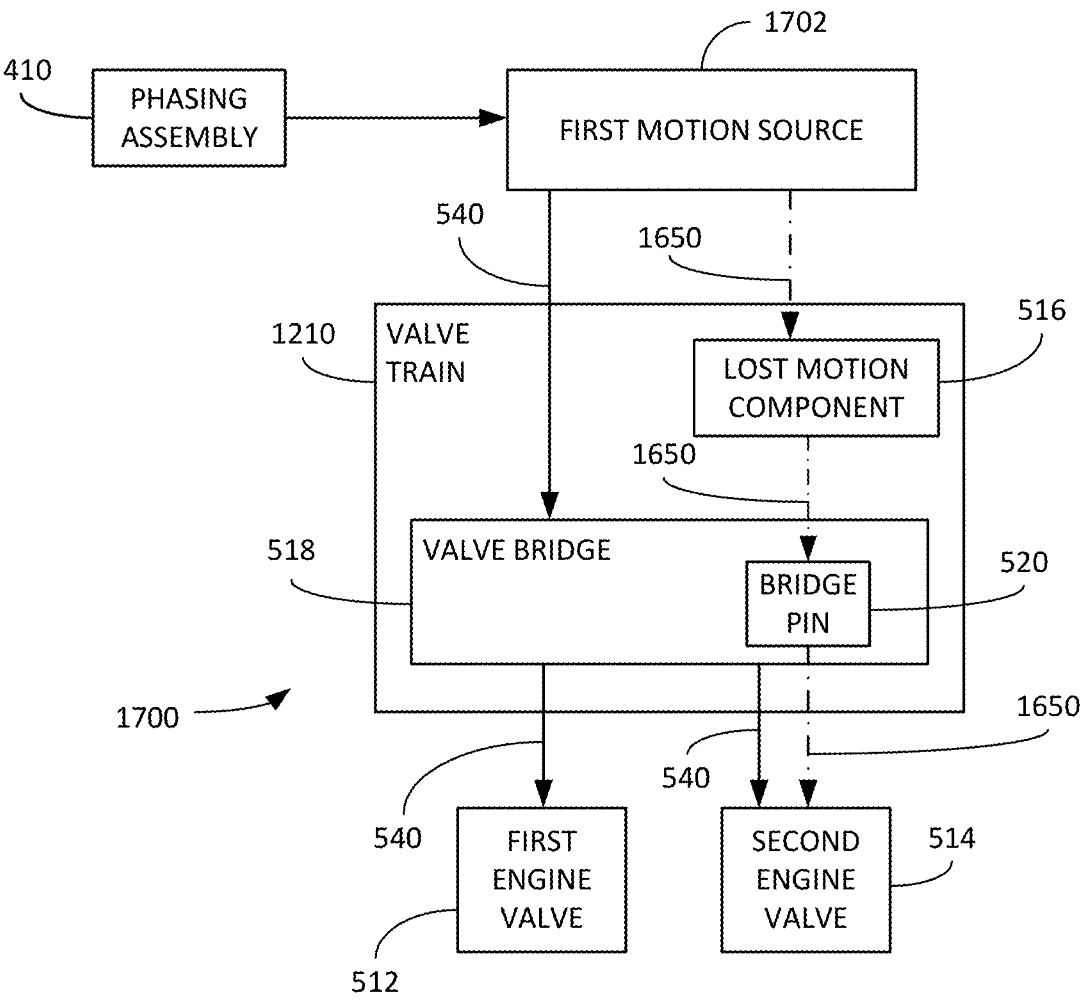
FIGS. 17 and 18 respectively illustrate first and second variants of the fourth specific embodiment of FIG. 16 in accordance with the instant disclosure.

Referring now to FIG. 17, a first variant of the fourth specific embodiment of a valve actuation system 1700 is schematically illustrated. In this case, the first motion source 1702 does not provide any auxiliary valve events system 1700, but does provide both the main exhaust valve events 540 and recompression relief valve events 1650. As a result, only the first lost motion component 516 is required. Thus configured, the system 1700 is also substantially similar to the valve actuation system 500 illustrated in FIG. 5, with the exception that only a single motion source 1702 is required.

In the embodiment of FIG. 17, a typical integrated rocker brake (IRB) could be employed in the valve train 1210 to convey the valve events 540, 1650. Here, the first lost motion component 516 could be a lost motion actuator in the IRB configured to actuate a single engine valve, in this case according to the recompression relief valve events 1650. On the other hand, typical, non-selectable components in an IRB, e.g., a swivel or e-foot as known in art, can be used to actuate both the first and second engine valves 512, 514, in this case according to the main valve events 540.

Figure 18:
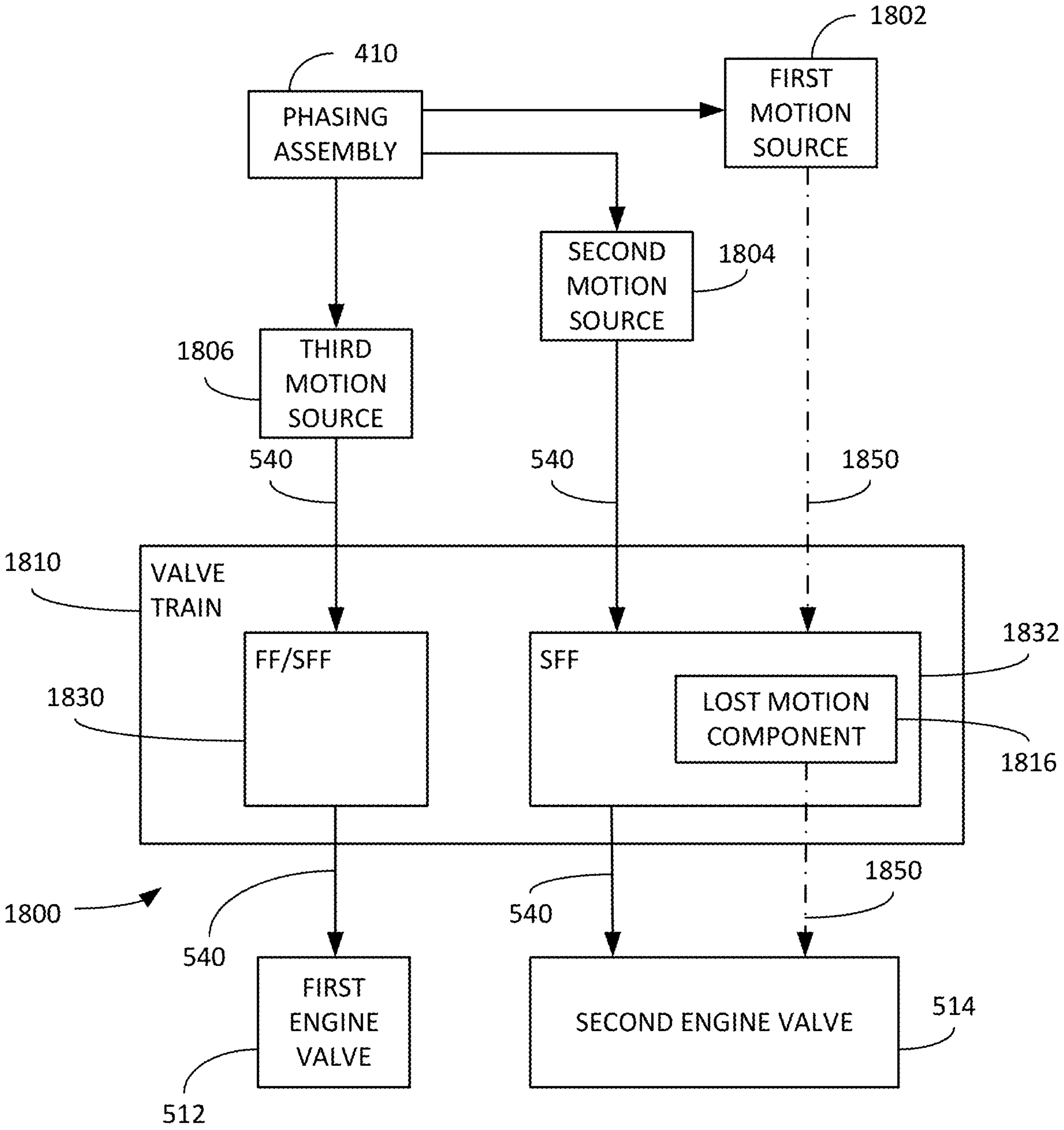

Referring now to FIG. 18, a second variant of the fourth specific embodiment of a valve actuation system 1800 is schematically illustrated. The system 1800 is similar to the embodiment illustrated in FIG. 117 in that only a single lost motion component 1816 is employed. However, in this case, the functionality otherwise provided by the valve bridge 518 and bridge pin 520 is provided by a pair of Type II finger followers, at least one of which is a switching finger follower such as that described in U.S. Pat. No. 11,060,426 ("the '426 patent"). In particular, the '426 patent teaches a switching finger follower (SFF) comprising a follower body configured to pivot at one end thereof and a lever adapted to pivot relative to the follower body. A lost motion component (adjustable support assembly) is provided that permits the lever to assume various latch positions relative to the follower body. A pair of cam rollers are deployed on the follower body, whereas a middle or central cam roller is deployed on the lever. The follower body cam rollers are configured to receive valve actuation motions from one motion source (i.e., a pair of identical cams), and the lever cam roller is configured to receive valve actuation motions from another motion source. Through operation of the lost motion component, valve actuation motions from either or both of the motion sources may be conveyed through the switching finger follower.

Thus, as shown in FIG. 18, the valve train 1810 comprises two finger followers 1830, 1832 corresponding to the first and second engine valve 512, 514. In an embodiment, the first finger follower 1830 associated with the first engine valve 512 may comprise either a non-switching finger follower (i.e., one that simply conveys valve events received thereby without the possibility of lost motion) or a switching finger follower. The second finger follower 1832 associated with the second engine valve 514 is a switching finger follower comprising a lost motions component 1816.

In this embodiment, a first motion source 1802, a second motion source 1804 and a third motion source 1806 are provided. Likewise, as shown in FIG. 18, all of the motion sources 1802, 1804, 1806 are operatively connected to and therefore commanded by the phasing assembly 410. The third and second motion sources 1806, 1804 are configured to provide identical main exhaust valve actuations 540 to the first engine valve 512 and second engine valve 514, respectively. Where the first finger follower 1830 is configured as a non-switching finger follower, the main exhaust valve events 540 are simply transmitted to the first engine valve 512.

In the context of the switched finger follower taught in the '426 patent, the second motion source 1804 is configured to provide the main exhaust valve events 540 to the follower body cam rollers. On the other hand, and again in the context of the switched finger follower taught in the '426 patent, the first motion source 1802 is configured to also provide the recompression relief valve event 1850 to the lever pivotably mounted to the follower body.

In an alternative embodiment, the system 1800 may be configured such that that phasing assembly 410 is configured to advance the phase of only the second and third motions sources 1806, but not the first motion source 1802. Because the recompression relief valve events 1850 are conveyed to the second engine valve only when the main exhaust valve events 540 are advanced by the phasing assembly 410, it may be possible to configure the recompression relief valve events 1850 to be time to cooperate only the advanced main exhaust valve events 540, i.e., the recompression relief valve events 1850 would be effective advanced already and therefore not require active control through the phasing assembly 410.

Thus, when the lost motion component 1816 operates in its retracted/compliant/unlocked state, the recompression relief valve events 1850 provided by the first motion source 1802 are lost, whereas the main exhaust valve event 540 received from the second motion source 1804 is conveyed by the follower body. When the lost motion component 1816 operates in its extended/rigid/locked state, the lever is effectively coupled to the follower body such both the main exhaust valve events 540 and the recompression relief valve events 1850 are conveyed to the second engine valve 514. That is, similar to the recompression relief valve event 850 illustrated in FIGS. 9 and 10, the recompression relief valve event 1850 in FIG. 18 is added to the main exhaust valve event 540 by operation of the switching finger follower 1832.

While the various embodiments in accordance with the instant disclosure have been described in conjunction with specific implementations thereof, it is evident that many alternatives, modifications and variations will be apparent to those skilled in the art. Accordingly, the preferred embodiments of the invention as set forth herein are intended to be illustrative only and not limiting so long as the variations thereof come within the scope of the appended claims and their equivalents.

What is claimed is:

1. A system for actuating two or more engine valves in an internal combustion engine, the system comprising:

at least one motion source configured to provide a plurality of valve events, the at least one motion source including a first motion source configured to provide an exhaust main valve event of the plurality of valve events; and a valve train configured to convey the plurality of valve events from the at least one motion source to the two or more engine valves, the valve train comprising a lost motion component configured to selectively convey at least one valve event of the plurality of valve events from the at least one motion source to at least a first engine valve of the two or more engine valves;

a phasing assembly configured to selectively advance a phase of at least the first motion source so as to advance a phase of the exhaust main valve event, wherein the at least one motion source is configured to provide a recompression relief valve event to at least the first engine valve via the valve train and the at least one lost motion component when the phase of the exhaust main valve event is advanced.

2. The system of claim 1, wherein the recompression relief valve event is configured to overlap with an intake main valve event.

3. The system of claim 1, wherein the at least one motion source further includes a second motion source configured to provide the recompression relief valve event.

4. The system of claim 3, wherein the phasing assembly is further configured to selectively advance a phase of the second motion source so as to advance a phase of the recompression relief valve event.

5. The system of claim 3, wherein the second motion source is further configured to provide an auxiliary valve event of the plurality of valve events.

6. The system of claim 3, wherein the at least one motion source further includes a third motion source configured to provide an auxiliary valve event of the plurality of valve events.

7. The system of claim 1, wherein the first motion source is further configured to provide the recompression relief valve event.

8. The system of claim 7, wherein the at least one motion source further includes a second motion source configured to provide an auxiliary valve event of the plurality of valve events.

9. The system of claim 8, wherein the phasing assembly is further configured to advance a phase of the second motion source so as to advance a phase of the auxiliary valve event.

10. The system of claim 7, wherein the first motion source is further configured to provide an auxiliary valve event of the plurality of valve events.

11. A method for actuating two or more engine valves in an internal combustion engine, the method comprising:

providing a plurality of valve events via at least one motion source;

providing an exhaust main valve event of the plurality of valve events via a first motion source of the at least one motion source;

conveying the plurality of valve events from the at least one motion source to the two or more engine valves via a valve train;

selectively conveying at least one valve event of the plurality of valve events from the at least one motion source through a lost motion component of the valve train to at least a first engine valve of the two or more engine valves; and selectively advancing a phase of at least the first motion source so as to advance a phase of the exhaust main valve event via a phasing assembly, wherein the plurality of valve events includes a recompression relief valve event conveyed to at least the first engine valve when the phase of the exhaust main valve event is advanced.

* * * * *